United States Patent Office 3,347,958
Patented Oct. 17, 1967

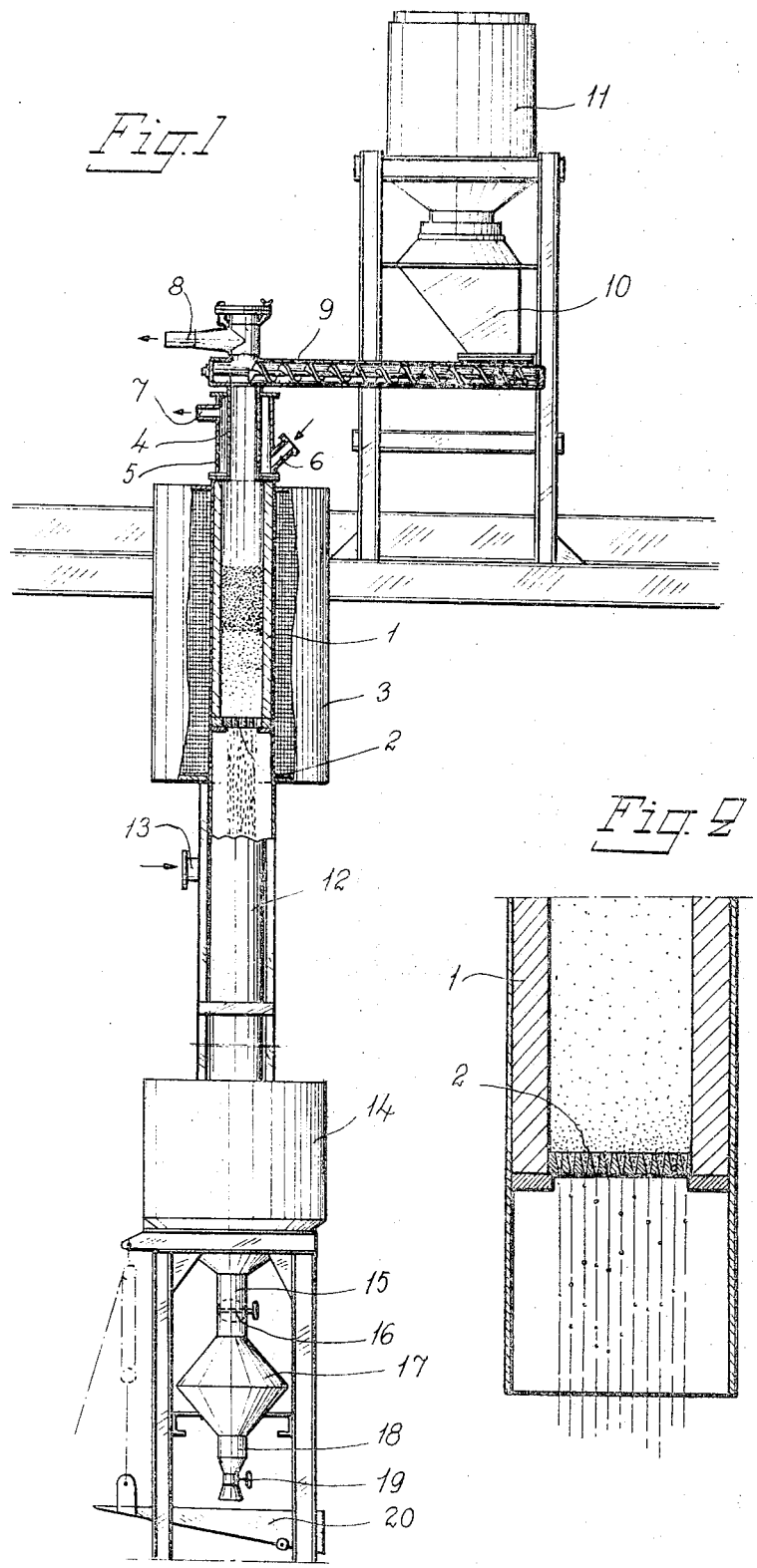

3,347,958
PROCESS FOR PREPARING GRANULAR
FERROSELENIUM
Hans Torbjörn Lundström and Sven Johan Walldén,
Skelleftehamn, and Karl Axel Melkersson, Halsingborg, Sweden, assignors to Bolidens Gruvaktiebolag,
Stockholm, Sweden, a joint-stock company limited of
Sweden
Filed Sept. 18, 1964, Ser. No. 397,534
Claims priority, application Sweden, Sept. 20, 1963,
10,305/63
7 Claims. (Cl. 264—13)

Ferroselenium has recently attained an increasing technical use, for instance in the steel works as an additive for steel ingots. Ferroselenium is thereby produced conventionally by a simple sintering process yielding a porous and brittle product. To charge such a product in a steel bath is accompanied by the disadvantage that due to the low bulk density the ferroselenium bodies obtained flow on the surface of the steel bath and therefore are difficult to dissolve and distribute rapidly in the bath. It is therefore desirable to charge the ferroselenium in powder form. However, in crushing and grinding the ferroselenium bodies produced in a conventional manner great disadvantages appear due to the problem of dust. The presence of ferroselenium dust in the air cannot be allowed on account of the health hazards associated therewith, especially with respect to the fact that ferroselenium when coming in contact with acids forms hydrogen selenide which is one of the most toxic gases existing (approximately 200 times more toxic than hydrogen cyanide). Furthermore, on account of the sharpness of the particles a ferroselenium powder produced by grinding has a tendency to clog and hang up in pockets and charging devices.

According to the present invention a process for the production of ferroselenium in granulated form is provided, and more especially a process in which a powdered mixture of selenium and iron is heated to sintering temperature and thereafter to melting temperature whereby a reaction takes place under formation of an alloy between selenium and iron. The process is characterized by the fact that formed ferroselenium is caused to fall freely in molten condition into a cooling liquid, preferably water, whereby the ferroselenium product is obtained in the form of small nodules or granules.

The intended ferroselenium product will have a composition approximately corresponding to the formula FeSe (58.57% Se). An investigation of the phase diagram Fe-Se indicates that at 54.7% Se an eutectic exists between a phase rich in iron (<10% Se) and FeSe. The eutectic temperature is approximately 880° C. and from this point the liquidus curve rises steeply on both sides of 54.7% Se. At 44% Se a further eutectic exists at approximately 930° C., a mixing space existing between 44% and 54% Se. If the composition of the incoming iron-selenium mixture is selected below 54.7% Se the iron-rich difficult-to-melt phase is precipitated. As an intermediate step a phase containing approximately 44% Se is possibly precipitated. The iron-rich phase may be collected in the melting container and cause disturbances in operation. If the composition of the iron-selenium mixture is selected over 54.7% Se the phase FeSe is precipitated which has a relatively high selenium vapor pressure so that selenium dissipates. To avoid disturbances in operation, for instance caused by resulting precipitation of the difficult-to-melt iron-rich phase as well as inhomogeneities in the incoming iron-selenium mixture, a certain excess of selenium therefore ought to be used. With 55 to 56% selenium in the incoming mixture, disturbances in the operation are avoided and a granulated product containing approximately 54.7% Se is obtained.

As a starting material for the melting, a mixture of iron and selenium powder, in the prescribed mixing proportions, is used, i.e. as mentioned, preferably with somewhat higher selenium content than that which corresponds to the selenium content of the eutectic mixture. The particle size is not critical but the constituents must be carefully mixed so that the composition of the mixture is constant throughout the whole mixture. As a charging material it is also suitable to use granules separated from the final product and having particle sizes outside the desired range.

In heating the charging material, the material starts first to sinter, and at 350 to 400° C. the charge "ignites," i.e. a reaction between selenium and iron takes place under heat evolution whereby the temperature rises up to approximately 750° C. By application of external heat the mixture is heated to a molten state at approximately 950° C.

At the melting temperature, the ferroselenium is very aggressive and reacts freely with most conventional crucible materials. For this reason the melting is performed in a melting container which is manufactured from a material inert with respect to the reaction mixture. Graphite has proved itself extraordinarily well suited for this purpose since it is not only inert to ferroselenium but, moreover, is not wetted by the same, and is a good conductor for the externally applied heat. Other materials having desirable properties are chamotte graphite, carbides and nitrides such as silicon carbide and boron nitride.

To prevent the oxidation through the influence of atmospheric oxygen the melting is preferably carried out under a protecting atmosphere whereby the air is expelled from the crucible space by rinsing with an inert gas such as nitrogen or argon.

The melt is drained through one or more orifices in the bottom of the crucible. Such factors as the diameter of the orifices in the bottom of the crucible, the height of fall, the temperature and viscosity of the melt in the draining operation as well as the temperature, specific heat and heat of vapor formation are determining in an optimum course of granulation. In general, these factors ought to be adapted to each other so that a balanced condition is obtained between kinetic energy, surface energy and viscosity so that spherical, homogeneous and strong nodules of the desired size are obtained.

Depending on the desired size of the nodules, the orifices in the bottom of the crucible may vary from 0.5 to 5 mms. The droplets formed shall preferably fall through a gas which does not react with the molten ferroselenium, i.e. an inert gas such as, for instance, nitrogen or argon.

According to experiments carried out by the inventors it has been found that the most suitable form and size of the granules is obtained at a height of fall of 7 to 9 meters, although it is also possible to extend these limits, for instances 3 to 12 meters. However, if the height of fall is too low, the granules will not become spherical and will easily burst. On the other hand, if the falling height is too high they become unnecessarily small and uneven. By height of fall is meant the vertical distance between the draining orifices and the level of the cooling liquid.

Ordinary water is used as a suitable liquid, with a temperature which is higher than room temperature, for instance 30 to 90° C., preferably 50 to 60° C., which has been found experimentally.

Another object of the invention is an apparatus for performing the process described above, which apparatus according to the invention comprises a crucible for the heating and melting of a powdered mixture of ferroselenium and iron, said crucible consisting of or being lined with a material which is resistant to corrosion and non-wettable with respect to the reaction mixture, preferably graphite, said crucible being provided with a draining means so that the ferroselenium is allowed to run, by free fall, in a molten state, substantially vertically downwards; a fall shaft provided in the falling path of the descending melt; and a collecting container intended to be filled with a cooling liquid in which collecting container the shaft opens with its lower open end below the intended liquid level in the collecting container.

The invention will now be further explained with reference to the attached drawing which shows an embodiment chosen as an example of an apparatus for performing the process claimed.

FIGURE 1 is an elevation, partly in section, of the main parts of the apparatus, and FIGURE 2 shows the lower part of the melting crucible with its perforated bottom. The apparatus illustrated in FIGURE 1 comprises a graphite crucible 1 with a cylindrical casing and a bottom 2 having a plurality of orifices for the draining of the ferroselenium melt. In the bottom of the crucible the number of orifices present should be so great that the molten ferroselenium is not accumulated in the crucible. The entire crucible is surrounded by an electrical resistance furnace 3 which may suitably be provided with separate heating elements at the top and bottom to enable a variation of the supply of heat which at instances has to be concentrated to the lower part of the crucible. A charging tube 4 arranged above the crucible extends with its lower end to the upper part of the crucible 1. The charging tube 4 is surrounded by a jacket 5 for passing cooling air supplied to an inlet pipe socket 6 and expelled through an outlet pipe socket 7. By cooling the charging tube 4 a melting and sticking of ferroselenium to the wall of the tube is prevented. A pipe socket 8 is connected to the upper part of the charging tube 4 whose purpose is for the expelling of gases and dust from the system. The powder mixture is conveyed to the charging tube 4 by means of a feed worm 9 from a pocket 10 and a supply container 11 situated above the same.

Below the bottom 2 of the crucible 1 a shaft 12 having a length of 7 to 9 meters and a diameter of, for example, 0.5 meters is provided. The shaft 12 is provided with a pipe socket 13 for introducing an inert gas into the system. The shaft opens with its lower end into a collecting container 14 consisting of a cylindrical jacket and a funnel-shaped bottom connecting itself to a central connecting tube 15 provided with a throttle 16, an under, lesser, collecting container 17 having a drain 18 which is held closed by means of a clamp valve 19 at the bottom. Under the drain is found a tiltable sieve 20 on which the material is dried by air and from which the completed granulated product thereafter may be discharged. The collecting container 14 is suitably closed by means of an upper cover provided with an opening adapted to the outer diameter of the shaft.

In preparation of the apparatus for its operation the container system 14–19 is filled with water until the water in the container 14 reaches the lower end of the tube 12. The shaft then becomes a closed chamber which is restricted upwardly by the bottom of the crucible and downwardly by a water level. From this chamber as well as the chamber of the crucible found above, the air is expelled by introducing an inert gas such as nitrogen or argon through the pipe socket 13 whereby the gas passes up through the orifices in the bottom 2 of the crucible 1 and leaves the apparatus through the pipe socket 8. The electric current is switched on and the furnace heated to approximately 1000° C. Cooling air is passed through the outer jacket of the charging tube so that the temperature shall nowhere be allowed to exceed the melting point of the selenium (220° C.).

In the production of ferroselenium in granulated form according to the novel process a previously formed intimate powder mixture of iron and selenium, if desired completed with undersized particles (dust) of previously produced ferroselenium granules as well as possibly sorted out oversized particles, is charged into the container 11. By means of the feed worm 9 the powder is transmitted to the charging tube 4 and falls through the same down into the crucible 1 placed in the furnace 3 and charges it to approximately ¾ of its height. The iron-selenium powder mixture is heated to sintering and reaction temperature (about 350° C.) whereby the iron and selenium react under generation of heat, whereby the temperature rises further approximately 400°, i.e. up to about 750° C. By continued heating of the crucible the reaction mixture is heated to a temperature within the range 900–1100° C., preferably about 950° C., whereby the mixture melts and collects at the bottom of the crucible, through whose orifices it is drained into the shaft in the form of relatively large globules which by striking the surface of the water in the collecting chamber burst into a large number of droplets which solidify rapidly into small granules. The formed granules fall further through the water in the collecting container 14 down into the lower colletcing container 17 and in time fill the same completely to the connecting tube 15. This can be observed, for example, by installing two diametrically opposite inspection glasses (not shown) in the tube 15. When the lower container 17 has been filled with granules the throttle 16 is closed and the clamp valve 19 opened, whereby the mixture falls down into the sieve 20. After drying by air and possible sieving the product is ready for use.

With a cooled charging tube 4 and a graphite crucible 1 which reaches right up to the charging tube, operational disturbances are not experienced within the sensitive zone where the wall temperature exceeds the melting point of the selenium but is lower than the melting point of the ferroselenium.

The ferroselenium level in the crucible is maintained at the desired height by adapting the charging of the powder to the drainage from the crucible. To safeguard oneself against an undesirable accumulation of the charging material supplied to the charging tube 4 the level of the charged material may be suitably watched and controlled in a manner known per se, for instance by means of a gamma radiator provided outside the furnace at the same height as ¾ of the height of the crucible, and a detector cooperating with the gamma radiator for receiving the radiation emitted from the gamma radiator and feeding the impulse to the input of the amplifying unit of the mechanism for controlling the charging, for instance by switching on and off the current to the driving motor of the feed worm. Another possibility of control consists in that one arranges about the lower part of the charging tube 4 an induction coil whose inductance changes if the tube is filled with reaction material. The inductance variations obtained may then, in the same way as the gamma radiator, be used for control of the guiding of the charging control mechanism. Such devices are known per se and do not constitute part of this invention.

The free height of fall of ferroselenium, i.e. the distance from the bottom of the crucible to the liquid level in the collecting container, should, in order to obtain the best product, be 7–9 meters. At too small a height of fall large uneven and burst granules are obtained. At too large a height of fall small irregular particles are formed. The height of fall must be adapted so that the relatively large falling globules are burst into a suitable number of smaller particles.

The liquid in the collecting container consists preferably of water although it is obviously possible to use another cooling liquid inert with respect to ferroselenium. The temperature of the water should be 50–70° C. At too low a temperature the droplets are cooled too violently so that sharp-edged irregular particles are formed. Too high a temperature gives a tendency to the formation of aggregates.

The invention is not limited to the embodiment of the apparatus shown in the drawing and is not either limited to the special process details described in connection therewith but may be varied in many ways within the scope of the attached claims.

What is claimed is:
1. The method for the production of ferrolsenium in granulated form comprising in order, the steps
   (a) feeding a powdered mixture of selenium and iron, said mixture having a selenium content of about 40–60%, to a sintering zone;
   (b) heating said mixture to a temperature at which the mixture sinters;
   (c) further heating the sintered material in a melting zone to cause the same to melt; and
   (d) causing the thereby formed molten ferroselenium to fall freely as discrete droplets from said melting zone a distance of from 3–12 meters into a body of aqueous liquid, whereby said droplets when striking the surface of the liquid are split up into smaller granules and thereafter solidified,
said heating and falling steps being performed in an atmosphere which is inert to ferroselenium.

2. The method as set forth in claim 1 wherein the distance is 7–9 meters.

3. The method as set forth in claim 1 wherein the aqueous liquid is maintained at a temperature within the range 30–90° C.

4. The method as set forth in claim 3 wherein the temperature of the aqueous liquid is 50–60° C.

5. The method as set forth in claim 1 wherein the selenium content of the initial mixture is 55–56%.

6. The method as set forth in claim 5 wherein the ferroselenium product contains 54–55% selenium.

7. The method as set forth in claim 1, wherein the molten ferroselenium is at a temperature of 900–1100° C.

References Cited

UNITED STATES PATENTS

| | | | |
|---|---|---|---|
| 2,544,678 | 3/1951 | Hancox et al. | 18—2.7 |
| 2,574,357 | 11/1951 | Stammer et al. | 264—13 |

FOREIGN PATENTS

| | | |
|---|---|---|
| 625,941 | 7/1949 | Great Britain. |

ROBERT F. WHITE, *Primary Examiner.*

J. R. HALL, *Assistant Examiner.*